Figure 3:
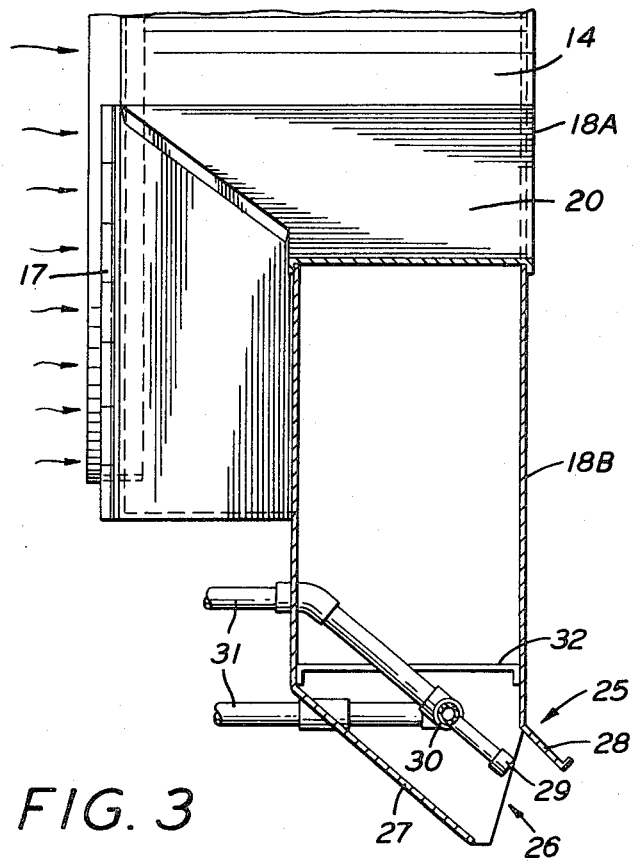
Figure 4:
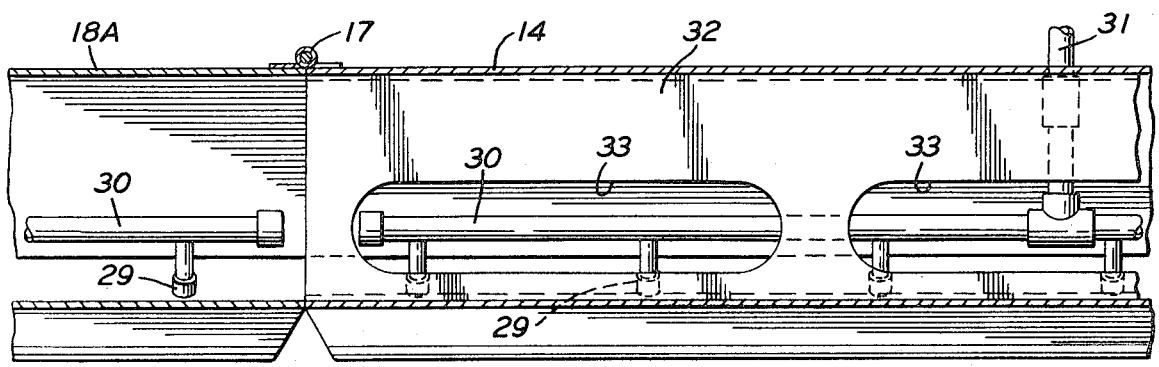

United States Patent [19]
Welch

[11] 3,804,332
[45] Apr. 16, 1974

[54] AIR BOOM CROP SPRAYER
[75] Inventor: Hugo Clayton Welch, Ashland, Ohio
[73] Assignee: McNeil Corporation, Akron, Ohio
[22] Filed: Jan. 22, 1973
[21] Appl. No.: 325,501

[52] U.S. Cl.................................. 239/77, 239/168
[51] Int. Cl.......................... A01n 17/08, B05b 1/20
[58] Field of Search....... 239/77, 78, 164, 166, 167, 239/168, 654, 655, 8, 159, 163

[56] References Cited
UNITED STATES PATENTS

| | | | |
|---|---|---|---|
| 2,695,812 | 11/1954 | Harz | 239/166 |
| 2,977,715 | 4/1961 | Lindsay | 239/77 X |
| 3,439,875 | 4/1969 | Randall et al. | 239/77 X |
| 3,512,714 | 5/1970 | Phelps et al. | 239/168 |
| 3,666,178 | 5/1972 | Crimmins et al. | 239/77 |

FOREIGN PATENTS OR APPLICATIONS

| | | | |
|---|---|---|---|
| 1,235,653 | 3/1967 | Germany | 239/77 |
| 685,211 | 12/1952 | Great Britain | 239/168 |

Primary Examiner—Robert S. Ward, Jr.
Attorney, Agent, or Firm—Hamilton, Renner & Kenner

[57] ABSTRACT

Disclosed is an apparatus and method for spraying crops, particularly low and densely growing crops such as spinach and the like. A blower in the form of an axial flow fan is oriented to move air in a direction generally parallel to the ground and into a first or central plenum chamber. The blast of air is directed from the first chamber and turned generally ninety degrees in a direction radially of the fan into at least one boom or wing-like chamber extending outwardly of the first chamber. The air is then permitted to leave each wing chamber and the center chamber in a generally downward and rearward direction through an opening or nozzle in the chambers at which time the air picks up insecticide or the like from a spray manifold and nozzle system located generally along the opening in the chambers. The spray laden air thus leaves the chambers, being downwardly and somewhat rearwardly directed, such that as the apparatus is moved through a field of crop, the spray will penetrate the foliage and displace the stagnant air trapped within the foliage.

7 Claims, 4 Drawing Figures

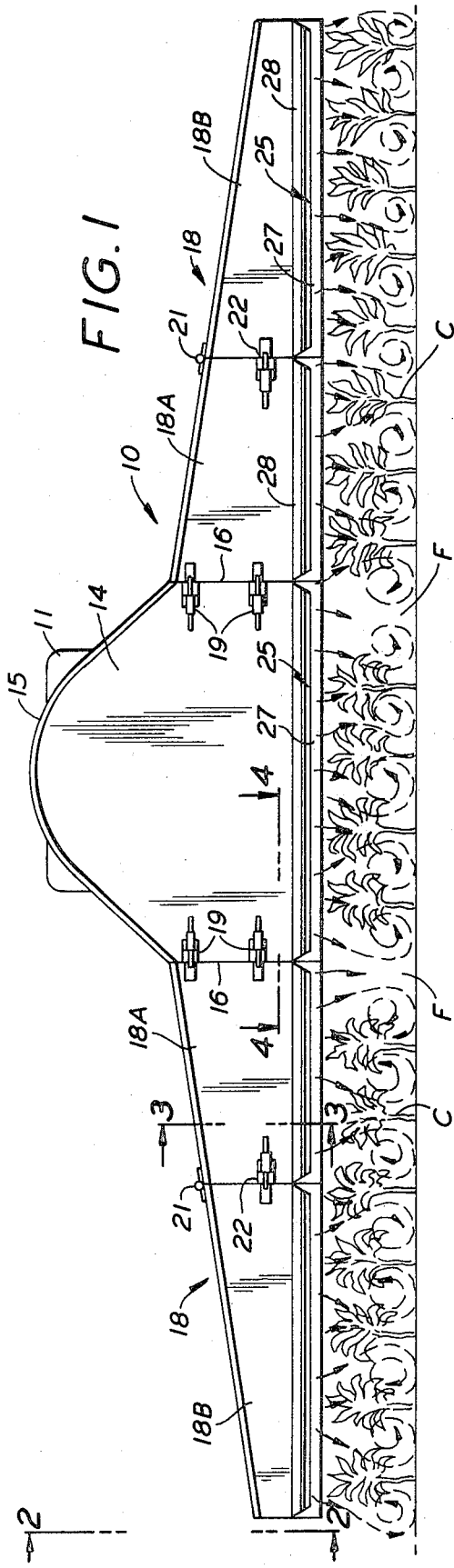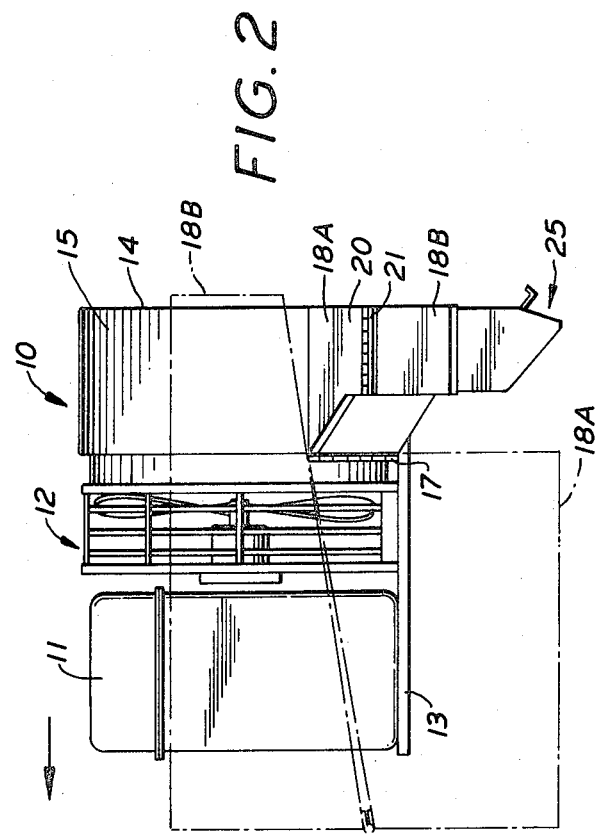

AIR BOOM CROP SPRAYER

BACKGROUND OF THE INVENTION

This invention relates to an apparatus and method for spraying field crops. More particularly, the invention relates to an apparatus and method for directing a spray laden blast of air generally downward on and through densely planted crops so that air trapped beneath the foilage thereof is displaced by the spray laden air.

Heretofore, large areas of field crops have been sprayed with insecticide and the like by one of two methods, either by aircraft overhead or powered centrifugal air blast sprayers moving through the field. In each instance, the blast of highly concentrated spray is directed generally laterally over the crop to hover in a cloud-like fashion until it eventually settles on the crop mainly through the influence of gravity. Except for the problems attendant such spraying techniques, such as wind effect and the like, such methods are usually satisfactory for crops which are not too densely planted or which do not have thick foliages associated therewith.

Because of the increasing desire of agriculturists to make more efficient use of available land and to render harvest more economical, crops are increasingly more often being planted quite closely together and in certain instances must be planted closely to achieve proper propagation. In addition, some greens, for example, spinach, grow into an interwoven tangle with stagnant air trapped within and under the foilage such that penetration by sprays through prior art techniques and displacement of the trapped air is virtually impossible. As such, the underside of these greens remain susceptible to disease and the like with only the tops thereof being protected.

SUMMARY OF THE INVENTION

It is therefore a primary object of the present invention to provide an apparatus and method for a more efficient spraying of closely planted crops, particularly those having dense foilage, such that a greater control of disease and pests is established.

It is another object of the present invention to provide an apparatus and method, as above, for penetrating dense crop foilage with spray laden air so as to displace the stagnant air within and under the foilage.

It is yet another object of the present invention to provide an apparatus and method, as above, which permits a direct discharge of spray laden air onto the crop foliage.

It is still another object of the present invention to provide an apparatus and method, as above, which will cover a large swath of crop during operation yet which is foldable for facile transport and storage.

It is a further object of the present invention to provide an apparatus and method as above which permits the use of less concentrations of insecticide or fungicide without a decrease in the efficiency of the protection of the crop.

These and other objects of the present invention which will become apparent from the following description are accomplished by improvements hereinafter described and claimed.

In general, the apparatus and method of the present invention includes an axial flow fan which can be mounted with an insecticide tank on a tractor or the like and which directs air rearwardly into a central air chamber suspended at the end of the fan. Most of the air in the central air chamber flows radially of the fan into wing or boom chambers which are hingedly mounted on the central chamber. The bottom of the central chamber and each boom has an opening therein forming an outlet for the air which, as it passes through the outlet, picks up insecticide being sprayed near the outlet from a manifold connected to the tank. The spray laden air is then forced into and through the foliage which is present beneath the outlet so that the air trapped within and under the foliage is displaced by the spray laden air. Means are provided to permit the folding of the wing chambers for storage or transportation during periods of non-use.

BRIEF DESCRIPTION OF THE DRAWINGS

FIG. 1 is a rear elevational view of the crop sprayer according to the concept of the present invention, showing a densely planted crop being sprayed.

FIG. 2 is a side elevational view taken substantially along line 2—2 of FIG. 1 showing a wing member in a folded position in phantom.

FIG. 3 is a sectional view taken substantially along line 3—3 of FIG. 1.

FIG. 4 is a sectional view taken substantially along line 4—4 of FIG. 1.

DESCRIPTION OF THE PREFERRED EMBODIMENT

An air boom crop sprayer according to the preferred embodiment of the present invention is indicated generally by the numeral 10 and is shown as operating in a field of crop C being closely planted and having a dense foliage. While sprayer 10 would be capable of extremely successful operation for any type of field crop, its intended primary use is for low growing dense crops such as spinach, lettuce or the like.

As best shown in FIG. 2, a tank 11 which can carry insecticide or the like and a blower, preferably a fan, indicated generally by the numeral 12, are mounted on a frame 13, shown somewhat schematically in FIG. 2. The frame 13 can be fixed to a tractor or other vehicle for transport through a crop field (with furrows F being preselectively spaced in the field to accommodate the vehicle wheels) or can be moved through the field (in the direction of the arrow, FIG. 2) by numerous other means such as by mounting frame 13 on sled-like skids. Fan 12 is of the axial flow type which will direct a blast of air generally rearwardly into a first or central plenum chamber 14. The top portion 15 of chamber 14 is generally parabolic shaped with the apex thereof conforming with the shape of the fan 12 so that the two can be readily connected by suitable means not shown. Top portion 15 terminates in two vertically oriented side surfaces 16 which are connected, as by hinge 17 (FIG. 4), to the inner portions 18A of two laterally extending wing-like booms or plenum chambers generally indicated by the numeral 18. Wing chambers 18 are substantially identical in structure so that the description of one, hereinafter to follow, will be applicable to both.

Section 18A of each chamber 18 is maintained in operating position by clamp locks 19 shown somewhat schematically in FIG. 1. Section 18A narrows to a neck 20 which has affixed thereto, as by hinge 21, the outer portion 18B of chambers 18. Sections 18B are maintained aligned and in operative position with sections 18A by clamp locks 22. As best shown in chain lines in FIG. 2, chamber sections 18 may be folded for storage or transport by first folding them inwardly against the machine on hinge 17 and then by folding section 18B on hinge 21 onto section 18A so that the storage or transport position shown in FIG. 2 is assumed.

The majority of the air directed axially of fan 12 (parallel to the ground) into central plenum chamber 14 is directed laterally into plenum wing chambers 18. Due to this high pressure blast of air, numerous structural supports or the like (not shown) can be provided internally of the chambers 14 and 18 to prevent undue vibration or noise. The air which fills chambers 14 and 18 is permitted to escape downwardly and rearwardly through a nozzle section at the lower end of each chamber generally indicated by the numeral 25. There are five separate nozzle sections in all, being located at the bottom end of plenum chambers 14, 18A and 18B, which are generally identical such that the description of one will apply to all.

As best shown in FIG. 3, each nozzle section 25 includes an outlet opening 26 in the plenum chamber. Opening 26 is defined by a director plate 27 which can be oriented at approximately and preferably 50° from vertical so as to guide the air generally rearwardly (as the tractor or other carrier of sprayer 10 moves through the field) and a deflector plate 28 oriented at approximately 45° from vertical to direct a majority of the air exiting through outlet 26 downwardly. While the precise angles of these members is not critical, it has been found that the 50° and 45° orientations described are best suited to create the desired turbulence in dense foliage with a range of 30° – 50° being adequate for plate 27. Whatever the angle of plate 27, it is quite important that the angle of the deflector plate 28 be less than the angle to the director plate 27 to assure a downward component of the air blast.

As the air is directed downwardly and rearwardly through outlet 26 it picks up a spray of insecticide being emitted from a plurality of nozzles 29 located in or near outlet 26 and connected to manifolds 30 which receive the supply of insecticide from tank 11 as by piping 31. The output from chambers 14 and 18 is thus a blast of air containing and carrying a mist of insecticide or fungicide downwardly through the crop C to displace the air trapped therein. The rearward component of the entrained spray from outlet 26 assures that the tops of the crop properly receive the spray material.

Thus the air is first directed axially of the fan 12 into chamber 14, radially or laterally into chambers 18, and then downwardly through nozzles 25 which direct the air downwardly and rearwardly onto the crop. Of course, it should be appreciated that some of the air received by chamber 14 will be directed immediately downwardly and out opening 26 in chamber 14 rather than radially into chambers 18. So that too much air is not lost through opening 26 in section 14, and to thus assure that most of the air is directed radially into chambers 18, a throttle plate 32 is placed at the bottom of chamber 14 over the opening 26 therein. Throttle plate 32 has openings 33 spaced therein to permit a restricted amount of flow therethrough. While it is evident that turning vanes or the like could be added in chamber 14 to more quickly divert the air to chambers 18 without departing from the concept of this invention, it has been found that such vanes only add friction and turbulence to the system and that the throttle plate 32 creates the same effect with far better results.

It should thus be evident that a sprayer 10 manufactured and operated as herein described will effectively distribute spray material to and within large swaths (up to 20 feet or more) of densely planted crops to displace air trapped within and to fight insects and disease, thus substantially improving the spraying art.

1. Apparatus for spraying crops in a field with insecticides and the like while the apparatus is moving through the field comprising a tank holding the insecticide material, an air chamber, blower means for providing air generally parallel to the direction of movement in the field and into said chamber, said chamber extending outward in a direction generally lateral to the movement in the field and having an outlet near the bottom thereof, said chamber including a central section and a pair of laterally and oppositely extending folding booms, said central section receiving air from said blower means, each said boom having a first section hingedly mounted to said central section and horizontally swingable with respect thereto and having a second section hingedly mounted to said first section and vertically swingable with respect thereto, and means near said outlet receiving insecticide from said tank and emitting insecticide so that air passing generally downward through said outlet entrains the insecticide therein, transfers the insecticide directly to the crops in the field, and displaces air trapped within the foliage of the crop.

2. Apparatus according to claim 1 including means to lock said second sections to said first sections and said first sections to said central section during operation of the apparatus.

3. Apparatus according to claim 1 wherein said outlet is defined by a means to direct the air rearwardly to the direction of movement in a field and a means to deflect the air downwardly onto the crop.

4. Apparatus according to claim 3 wherein said means to direct the air rearwardly includes a plate mounted at an angle of 30° to 50° from vertical and said means to deflect the air downwardly is a plate mounted at an angle from vertical less than the angle from vertical of said plate of said means to direct the air rearwardly.

5. Apparatus according to claim 1 wherein said means near said outlet includes a manifold receiving insecticide from said tank and a plurality of spray nozzles directing the insecticide from said manifold toward said outlet.

6. Apparatus according to claim 1, further comprising throttle means at said outlet in said central chamber, said throttle means restricting the amount of flow through the outlet in said central chamber thereby directing more flow to said pair of laterally extending booms.

7. Apparatus according to claim 1 wherein said central section has a top portion of generally parabolic shape and terminating in two vertical side surfaces carrying said pair of booms.

\* \* \* \* \*